United States Patent [19]

Naito et al.

[11] 4,000,821
[45] Jan. 4, 1977

[54] APPARATUS FOR STORING UNSTACKING AND DELIVERING ARTICLES

[75] Inventors: Han-Ichiro Naito; Tsuneo Yamaguchi, both of Tokyo; Kiyoshi Harashima, Ome, all of Japan

[73] Assignee: Elecompack Company Ltd., Tokyo, Japan

[22] Filed: July 11, 1975

[21] Appl. No.: 595,164

Related U.S. Application Data

[63] Continuation of Ser. No. 258,179, May 31, 1972, abandoned.

[30] Foreign Application Priority Data

| June 3, 1971 | Japan | 46-38936 |
| Oct. 1, 1971 | Japan | 46-77002 |

[52] U.S. Cl. .................. 214/8.5 F; 221/253; 214/16 B
[51] Int. Cl.[2] .................. B65G 59/00; B65G 47/00
[58] Field of Search ........... 214/8.5 F, 8.5 G, 16 B, 214/8.5 R; 221/253, 7, 237, 208; 198/56–58

[56] References Cited

UNITED STATES PATENTS

| 1,254,085 | 1/1918 | Tarasch | 221/7 |
| 1,588,949 | 6/1926 | Drake | 214/16 B |
| 2,731,131 | 1/1956 | Shannon | 221/253 |
| 2,808,946 | 10/1957 | Just et al. | 214/16 B |
| 2,970,591 | 2/1961 | Paulsen | 214/8.5 G |
| 2,983,392 | 5/1961 | Ebbert | 214/16 B |
| 3,247,929 | 4/1966 | Langley | 214/16 B X |
| 3,439,834 | 4/1969 | Carter | 221/7 |

*Primary Examiner*—Robert J. Spar
*Assistant Examiner*—R. B. Johnson
*Attorney, Agent, or Firm*—Richard L. Cannaday

[57] ABSTRACT

An apparatus for storing and delivering articles, having storage means divided longitudinally into a plurality of storage compartments each for storing a plurality of articles therein, and article delivery means provided at a delivery opening for each storage compartment for delivering one or a plurality of articles from said delivery opening, said article or articles delivered from each of said delivery openings being conveyed to a desired location by conveyor means.

2 Claims, 13 Drawing Figures

APPARATUS FOR STORING UNSTACKING AND DELIVERING ARTICLES

CROSS REFERENCE TO RELATED APPLICATION

This is a continuation of application Ser. No. 258,179, filed May 31, 1972 and now abandoned.

This invention relates to an article storing and delivering apparatus used for storing articles therein and delivering one or a plurality of the stored articles therefrom.

When a plurality of different kinds of parts are assembled to produce product assemblies or a plurality of different types of product assemblies are handled, stock control of these parts or product assemblies becomes necessary to properly store them separately by kinds or types. In such a stock control, when the articles to be handled are large in size or heavy in weight or when a large number of articles are handled at a time, it has been proposed to operatively combine a fork lift truck or overhead crane with a storage apparatus, so that the articles may be delivered from the apparatus or may be stored in the desired positions of the apparatus automatically without resorting to manual labor. However, when the articles of small sizes are handled in small quantities or a variety of articles are dispensed from the storage apparatus, it is usual to perform the storage and delivery operations manually. Further, in the stock control the total quantities of articles stored in or delivered from the storage apparatus can be easily controlled by checking the numbers of the articles but, for controlling the kinds as well as the numbers of the articles stored in or delivered from the storage apparatus, it becomes necessary to check the articles by kinds. Therefore, many people and accounting books are required at the present time for controlling the stocks with accuracy.

It is, therefore, an object of the present invention to provide an apparatus which is adapted for the stock control of a variety of kinds of articles as mentioned above.

According to the present invention there is provided an apparatus for storing and delivering articles, which comprises storage means divided longitudinally into a plurality of storage compartments each for storing a plurality of articles therein, delivery means provided at a delivery opening of each storage compartment for delivering one or a plurality of articles through said delivery opening, and conveyor means extending longitudinally of the storage means for conveying the delivered articles to a desired location, whereby the necessity for the operator to walk directly up to the pertinent storage compartment for storage or delivery operation is eliminated.

It is another object of the invention to provide an apparatus for storing and delivering articles, of the character described above, in which detector means is provided at the bottom of each storage compartment to detect the presence or absence of articles in said storage compartment.

It is still another object of the invention to provide an apparatus for storing and delivering articles, of the character described above, in which a pair of storage means are provided on both sides of one conveyor means to constitute a storage unit and a plurality of such storage units are arranged in spaced substantially parallel relation and further another conveyor means is provided in association with the delivery ends of the conveyor means of said respective storage units so that all the articles delivered from said respective storage units may be conveyed in the same direction and gathered at one location.

A further object of the invention is to provide an apparatus for storing and delivering articles, of the character described above, in which a plurality of said storage units are respectively mounted on carrier means shiftable in a direction substantially perpendicular to the longitudinal direction of the storage means and are closely arranged in a given space so as to leave a space sufficient to form one aisle providing for access of the operator to the desired storage compartment, so that an aisle may be formed between the desired unit and the adjacent unit by putting the units on both sides of said aisle together in close contact with each other upon shifting the carrier means on which the respective units are mounted, and a large number of storage means may be accommodated in a limited narrow space.

Other objects, features and advantages of the invention will become apparent from the following detailed description with reference to the accompanying drawings, in which:

Figure 1:
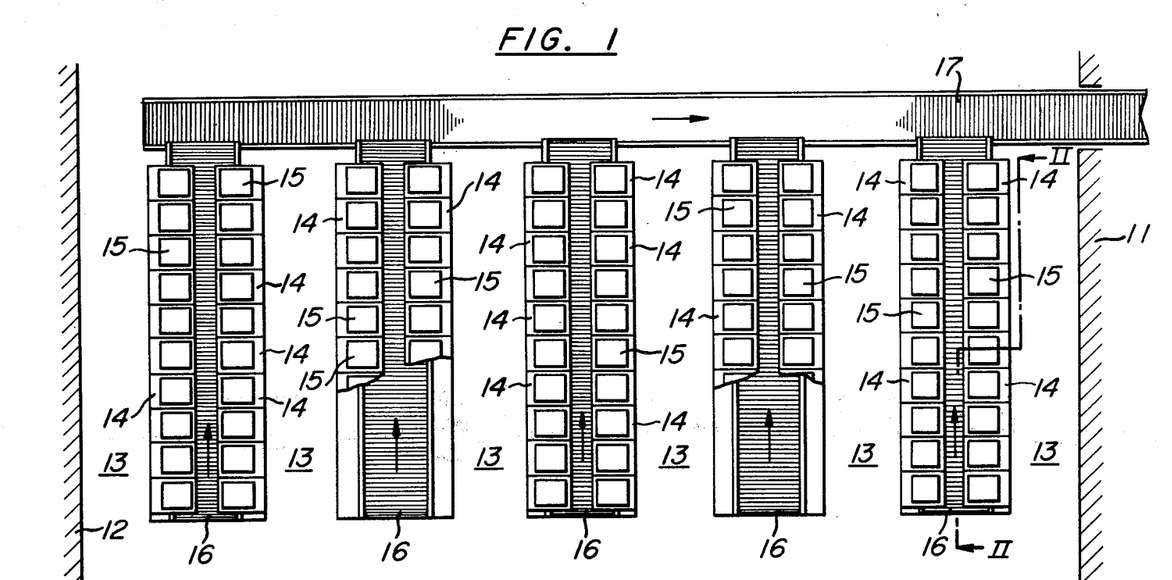
FIG. 1 is a plan view of an embodiment of the article storing and delivering apparatus of the present invention, comprising a plurality of storage units.

Referring to FIG. 1 there are shown five units of articles storing and delivery apparatus arranged between the opposite side wall 11, 12 of a warehouse or the like with a space, corresponding to an working aisle 13, between each other. Each unit has a total of 20 storage compartments 14 arranged in 2 rows each consisting of 10 storage compartments. The two rows of the storage compartments of each unit have therebetween a space sufficient to permit article storage cases 15, stacked in each storage compartment 14, to discharge onto a belt conveyor 16 provided therebelow. The article storage cases 15 are for accommodating parts or products therein and are not required where the articles to be stored can be stacked one on another. At the delivery ends of the respective conveyors 16 is provided another belt conveyor 17 for conveying the article storage cases, carried on said respective belt conveyors 16, to one place. In this embodiment, the conveyor means are belt conveyors driven by an electric motor or the like but a chute or roller conveyor may of course be used for sliding down the articles to be delivered under gravity.

Figure 2:
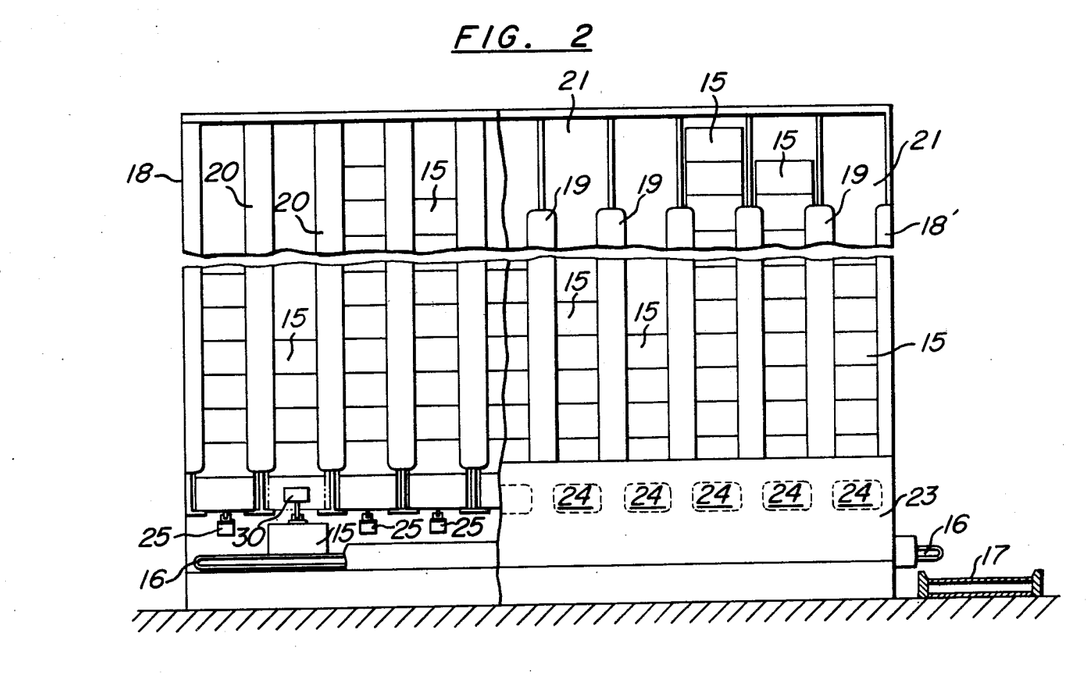
FIG. 2 is a side view of the apparatus taken on the line II — II of FIG. 1.

The storage compartments 14 at the opposite ends of each row are respectively defined by side plates 18, 18' having an L-shaped cross section and guide plates 19, 20 having a T-shaped cross section (FIG. 2). The rest of the storage compartments 14 are respectively defined by the guide plates 19, 20 arranged at the four corners of each of said compartment. The side plates 18 and guide plates 19, facing the working aisle 13, define a storage case inlet opening 21 at the upper portion of the associated storage compartment, and the inner side plates 18 and guide plates, 20, facing the adjacent row of storage compartments define a storage case delivery opening 22 at the lower portion of the associated storage compartment. A panel 23 is provided extending over the entire longitudinal length of the compartment row at lower portions of the guide plates 19 facing the working aisle 13. On the panel 23 are mounted delivery means 24 for discharging the lowermost storage cases 15 in the respective storage compartments through the delivery opening 22. Also provided at the bottom of each storage compartment 14 is detector means 25 for detecting the presence or absence of the storage cases 15 in said storage compartment.

The delivery means 24 and detector mean 25 will be described hereunder with reference to FIGS. 3 and 4. The delivery means 24 comprises a electromagnet 28 biased upwardly by a spring 26 and downwardly movably supported by a guide slots 27, and an operating rod 30 which is attracted by said electromagnet 28 against the biasing force of a spring 29 when said electromagnet is energized. Namely, the operating rod, when the electromagnet 28 is energized, projects into the storage compartment 14 through a hole 31 in the guide plate 19 and discharges the lowermost storage case 15 from said storage compartment.

Figure 3:
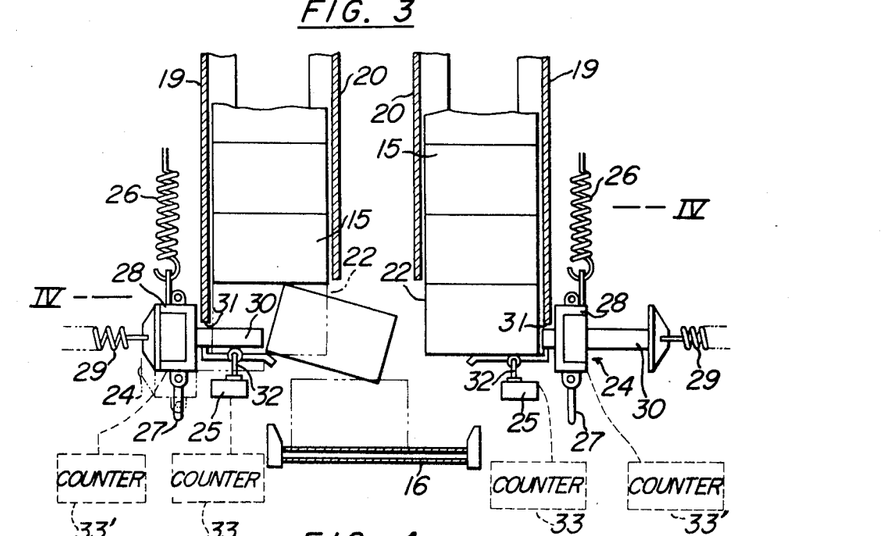
FIG. 3 is a side view showing the details of the delivery means.
Figure 4:
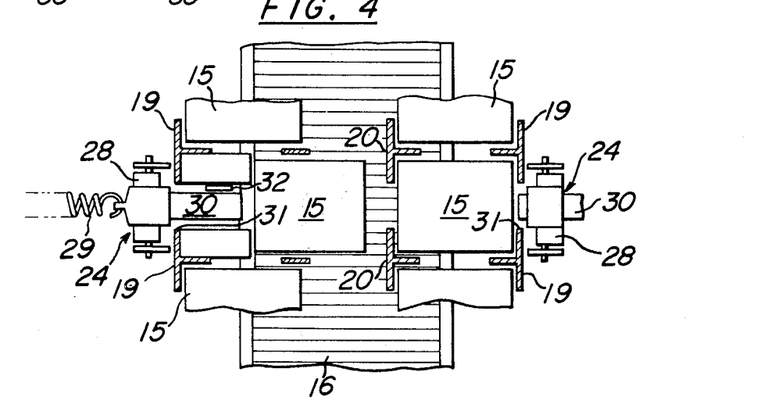
FIG. 4 is a plan view taken on the line IV — IV of FIG. 3.

The detector means 25 provided at the bottom of the storage compartment 14 consists of a microswitch of the type which is turned on by an operating member 32 when said operating member is depressed by the storage case 15, and turned off when the storage case 15 is discharged as shown at the left side of FIG. 3. The electromagnet 28 is operable when the microswitch is in its on-position. This detector means is to detect whether the storage case 15 is present at the delivery position of the storage compartment 14 and, therefore, may be a proximity switch that is turned on or off when the storage case 15 is located at the delivery position. The detector means 25 may be also a photoelectric means such as a phototube, a phototransistor or a photodiode arranged such that a light to be received by the photoelectric means is intercepted, by the storage case 15 located at the deliverly position.

Such being the construction, when the storage compartment of the desired unit and desired row is selected, the electromagnet 28 is actuated if the microswitch of the detector means 25 is in its on-position, and the operating rod 30 is projected into the storage compartment, whereby the lowermost storage case 15 is discharged from delivery opening 22 onto the belt conveyor 16. Since there is a slight time interval from the time when the lowermost storage case 15 is discharged to the time when the next storage case drops onto the detector means 25, the microswitch is turned off during this interval and the electromagnet 28 is also deenergized in response to a signal from said microswitch, so that the operating rod 30 is retracted to its original position under the biasing force of the spring 29. During the retracting motion, the operating rod 30 undergoes a downward force from the next storage case 15 which is falling to the delivery position. However, since the electromagnet 28 is resiliently supported by the spring 26, it also moves down incident to the downward movement of the next storage case 15. When the operating rod 30 is cleared from the storage case 15 and pulled out of the hole 31, the electromagnet 28 is returned to its normal position by the spring 26. The storage case discharged from the delivery opening 22 is conveyed on the belt conveyors 16 and 17 and delivered to the outside of the warehouse. The number of the storage cases 15 which have been delivered from the delivery opening 22 can be readily known by an arrangement such that the frequency of operation of the detector means 25 or the operation of the electromagnet 28 is counted and indicated by a counter 33 connected to the detector means 25 or alternately by a counter 33' connected to the electromagnet 28 as shown by dotted lines. Instead of the delivery means comprised of the electromagnet and operating rod, an arrangement may be made such that the bottom end of each storage compartment is opened and a frictional endless belt is provided beneath said open bottom end to deliver the storage cases by the friction of said endless belt.

Figure 5:
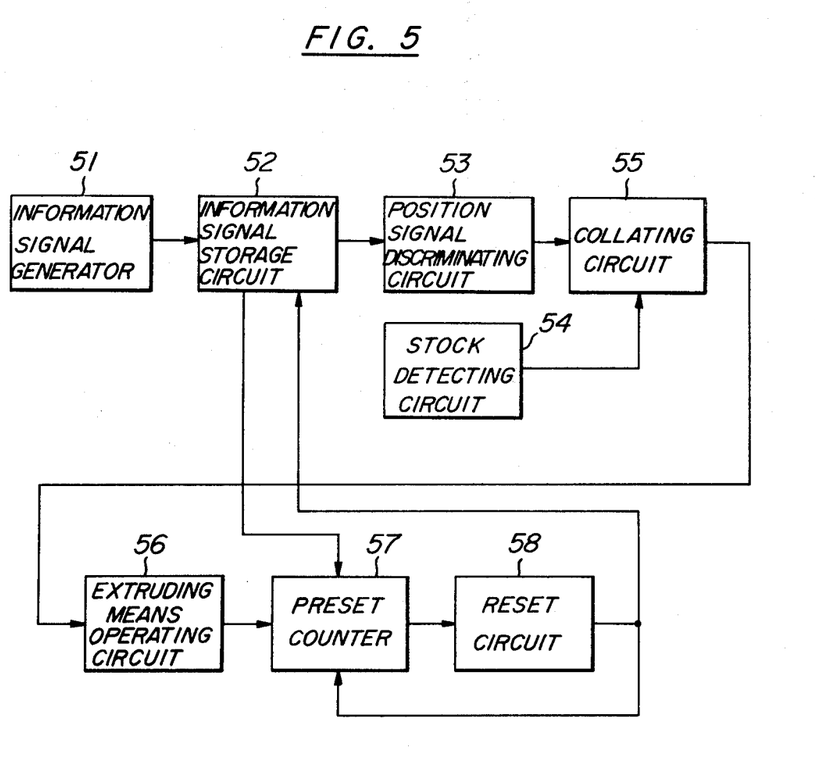
FIG. 5 is a block diagram showing the electrical control circuit of the apparatus.

FIG. 5 is a block diagram showing an electrical control circuit for delivering the storage case in the desired one of the large number of storage compartments as described above.

In FIG. 5, reference numeral 51 designates an information signal generator which generates a command signal in the form of a binary-coded decimal signal, equivalent to the output of a numeral key board, a card reader or a computer. The command signal is composed of a position signal which designates the position of the desired storage compartment, and a delivery signal which designates the number of articles to be delivered. Since the embodiment of the apparatus comprises 100 storage compartments, the position signal may be composed of a single numerical code designating the desired one of the storage compartments each of which is given a serial number, or may be composed of three numerical codes, i.e. a code designating the desired one of the working aisles 13 which are given serial numbers, such as the first aisle, the second aisle and so on from the left to right as viewed in FIG. 1, a code designating the left or right side of said desired aisle and a code designating the particular storage compartment on said left or right side of said aisle. The deliverly signal designates the number of storage cases desired to be delivered as stated above.

The position and delivery signals from the information signal generator 51 is supplied to an information signal storage circuit 52 which is consisted of a shift register, and are stored therein. Namely, a three digit position signal is stored when serial numbers are assigned to the 100 storage compartments respectively, and three position signals are stored when the position of each storage compartment is designated by an aisle number, the left or right side of the aisle and the sequential number assigned to the storage compartment on the specified side of the specified aisle, together with the delivery signal designating the number of articles desired to be delivered.

The position signal stored in the information storage signal circuit 52 is supplied to a position signal discriminating circuit 53 which is composed of a number of AND circuits corresponding to the number of decorders and storage compartments. The position signal discriminating circuit 53 is a circuit to determine the electromagnet of which one of 100 storage compartments should be actuated. When the position signal is supplied to this discriminating circuit 53, the specified electromagnet is placed in a position ready to be actuated. Therefore, in this circuit 53 the position signal is converted into a decimal signal by the decoder and the resultant decimal signal is supplied to the AND circuit corresponding to the each storage compartment.

However, if no storage case is present in the specified storage compartment, the operating rod when the electromagnet is actuated will be operated in vain without delivering storage case. For this reason, a stock detecting circuit 54 is provided which detects the on- or off-position of the detector means 25, disposed at the bottom of each storage compartment, as shown in FIGS. 3, 4, namely the presence or absence of a storage case 15 in the specified storage compartment. This stock detecting circuit 54 is composed of the detector means 25 and a chatterless circuit, and generates a signal when the storage case is present in the specified storage compartment.

The position signal from the position signal discriminating circuit 53 and the stock signal from the stock detecting circuit 54 are supplied to a collating circuit 55, which, upon ascertaining the presence of the storage case in the specified position, transmits a signal to an extruding means operating circuit 56 to actuate the electromagnet. Therefore, this collating circuit 55 is an AND circuit.

When the signal from the collating circuit 55 is supplied to the extruding means operating circuit 56, the delivery means 24 at the specified position is actuated to extrude one storage case 15 from the storage compartment 14 through the delivery opening 22. This operation continues while the position signal is continuously being supplied, whereby the storage cases 15 are extruded one after another. The signal from the extruding means operating circuit 56 is supplied to a predetermined or a preset counter 57.

The preset counter 57 performs addition of the inputs successively received from the extruding means operating circuit 57 during delivery of the articles, and generates one output signal when the result of addition matches with a preset input. Namely, this preset counter 57 is a two-input, one-output preset counter. It will, therefore by understood that, by arranging such that the stock signal designating the number of articles desired to be delivered and stored in the information signal storage circuit 52 will be supplied to one input of the preset counter 57 and the signal generated from the extruding means operating circuit 56 will be supplied to another input of said preset counter, an output signal indicating the completion of delivery is generated from the output of the preset counter 57 when the output signals of the extruding means operating circuit, counted by the preset counter, has reached the preset input supplied from said information signal storage circuit.

The output signal of the preset counter 57 is transmitted to a reset circuit 58, whereupon said reset circuit is actuated and generates a reset signal, which is transmitted to the preset counter 57 and information signal storage circuit 52 to reset them. Thus, all the circuits are restored when the desired number of storage cases 15 have been delivered.

Where the electrically operated belt conveyor 16 is used as the conveyor means, as shown, a timer or the like timing means may be used which is electrically connected with the extruding means operating circuit 56 to be actuated thereby, so that said belt conveyor may be driven intermittently for a limited period until the extruded storage case is conveyed to the delivery end of said belt conveyor.

Figure 6:
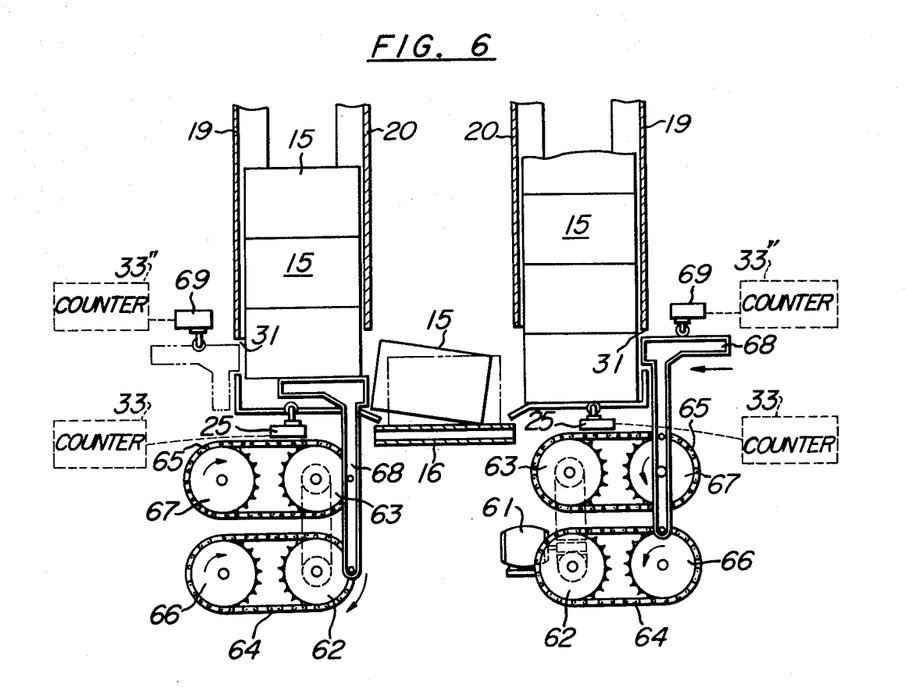
FIG. 6 is a side view showing another form of the delivery means.
Figure 7:
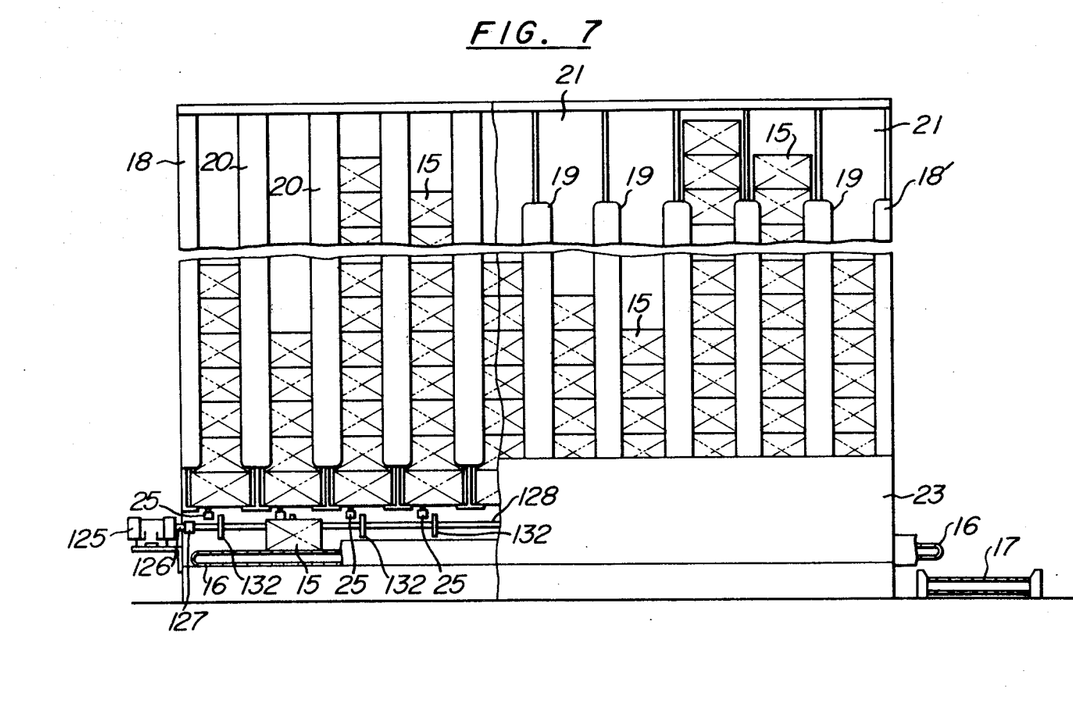
FIG. 7 is a side view similar to FIG. 2 but showing a still further form of the delivery means together with a storage means.

FIG. 6 shows another form of the extruding means. In the embodiment described, above, the storage cases 15 stacked in the storage compartment 14 fall a distance equal to the height of one storage case, when the lowermost storage case is extruded by the delivery means 24, and such delivery means is satisfactory when the parts or products contained in the respective storage cases are invulnerable to shock. However, when the parts or products are vulnerable to shock, it becomes necessary to lower and extrude the stacked storage cases slowly. Therefore, in the form shown in FIG. 6, the delivery means includes an extruding rod 68 which is operated by chains 64, 65 respectively driven by two drive sprockets 62, 63, driven from a motor 61 through a speed reduction gearing, and two driven sprockets 66, 67. The extruding rod 68 is connected at two points with the chains 64, 65 in such a manner that it is normally held in an upright position, and has such a shape that it pushes the upper portion of the storage case 15 while supporting the lower side of the next higher storage case at its upper edge. A limit switch 69 is provided to detect the position of the extruding rod 68, which is actuated by the upper edge of said extruding rod when said extruding rod 68 is outside the storage compartment 14 or in its inoperative position.

When the motor 61 is set in motion, the drive sprockets 62, 63 start to rotate slowly at the same rate of speed and, therefore, the extruding rod 68 also moves horizontally in the direction of the arrow in FIG. 6, pushing the lowermost storage case 15 while supporting the next higher storage case 15 at its upper edge. When the extruding rod 68 has reached the end of its extruding stroke and the lowermost storage case 15 has been extruded onto the belt conveyor 16 through the delivery opening 22, the extruding rod starts to move down slowly from the bottom of the storage compartment and reaches the end of its downward stroke as shown at the left side of FIG. 6. Then, the extruding rod 68 moves to the end of its return stroke exterior of the storage compartment 14 and moves upward to its initial position as shown at the right side of FIG. 6. By employing such extruding means as described above, it is possible to extrude and lower the storage cases slowly, without giving any shocks thereto. The extruding rod position detecting limit switch 69 used in this form of extruding means is of the type which is turned on when engaging by the extruding rod 68 and turned off when released from the engagement with said extruding rod. The operation of the motor 61 can be controlled with accuracy by arranging such that the motor is set in motion when the limit switch 69 is placed in its on-position, continues its rotation even when the limit switch is turned off and stops rotating when the limit switch is again placed in its on-position. The same operation of the extruding rod as above described may be obtained by use of an eccentric cam or link mechanism in lieu of the sprockets and chains. The number of the delivered storage cases 15 can be known by an arrangement such that the frequency of operation of the detector means 25 or the limit switch 69 is counted and indicated by a counter 33 connected to the detector 25 or alternately by a counter 33' connected to the limit switch 69 as shown by dotted lines.

In the embodiment described above, each delivery means is provided with its own driving source, but in other embodiments of the invention shown in FIGS. 7 – 12, there are provided one deliverly means driving source at least for two storage compartments and switching means for selectively operating the delivery means to deliver from the desired storage compartment, so as to simplify the construction and hence reduce the cost of the delivery means.

First of all, the embodiment shown in FIGS. 7 to 10 will be described. In this embodiment, a motor 125 is mounted on one side plate 18 of each storage compartment row on the side close to the delivery openings 22 and its drive shaft 126 has one end of a rotary shaft 128 connected thereto through a coupling 127. The rotary shaft 128 extends below each storage compartment adjacent the delivery openings 22 of said compartment and is supported by bearings 129 arranged at a suitable interval between each other. These bearings 129 are mounted on brackets 131 connected to a frame 130. On the rotary shaft 128 are loosely mounted drive sprockets 132 in such a manner as will be rotatable independently of rotation of said rotary shaft, said drive sprockets 132 respectively being positioned centrally of the bottom ends of the storage compartments. Each of the drive sprockets 132 has a coaxial collar 133 and a projection 134 is provided on said collar 133. Adjacent to the projection 134 is provided clutch means consisting of a disc 135 and a cylindrical member 136, which clutch means is mounted on the rotary shaft 128 in such a manner that it is rotated shaft and also axially slidable thereon. The disc 135 is provided with a pin 137 for engagement with the projection 134 upon axial sliding movement of said clutch means, while the cylindrical member 136 is provided with an annular groove 138. The annular groove 138 has an engaging member 140 engaged therein which is connected to one end of an L-shaped lever 139. The L-shaped lever 139 is pivotally supported by a pin 141 at its bent portion and connected at the other end to an operating member 143 of an electromagnet 142. The electromagnet 142 when energized attracts the operating member 143, which in turn causes the clutch means to slide toward the drive sprocket 132.

Figure 9:
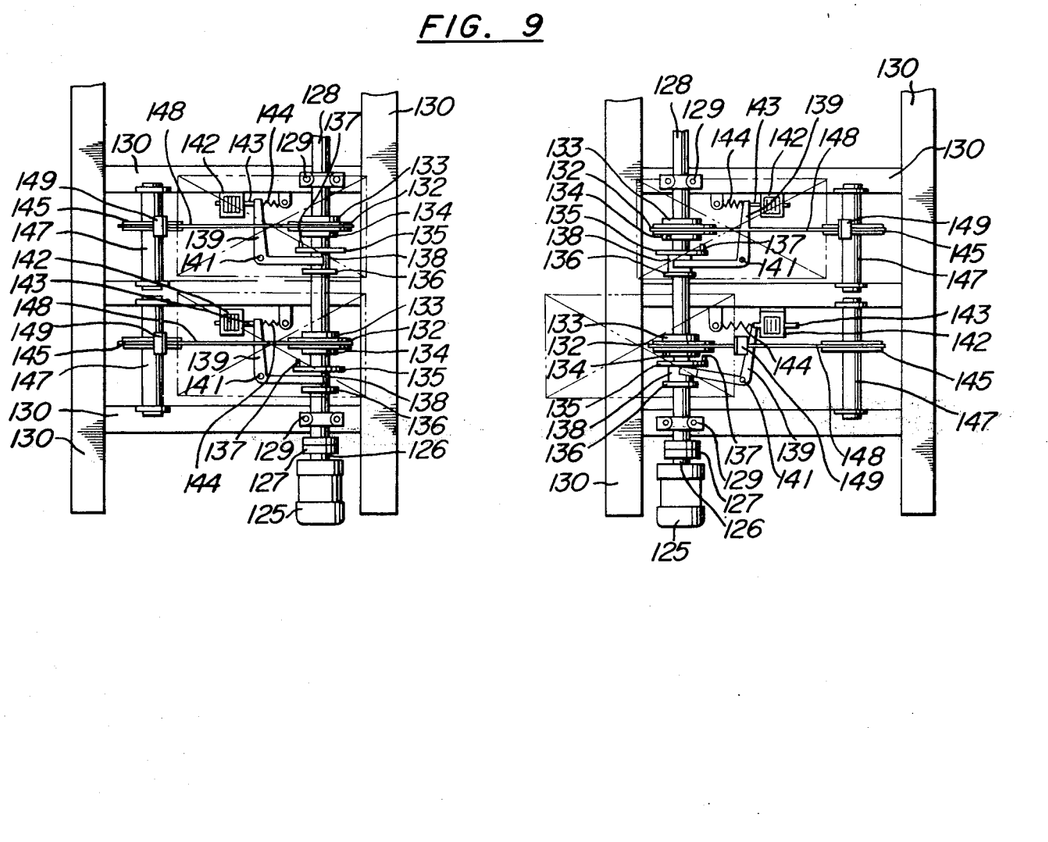
FIG. 9 is a plan view taken on the line IX — IX of FIG. 8.
Figure 10:
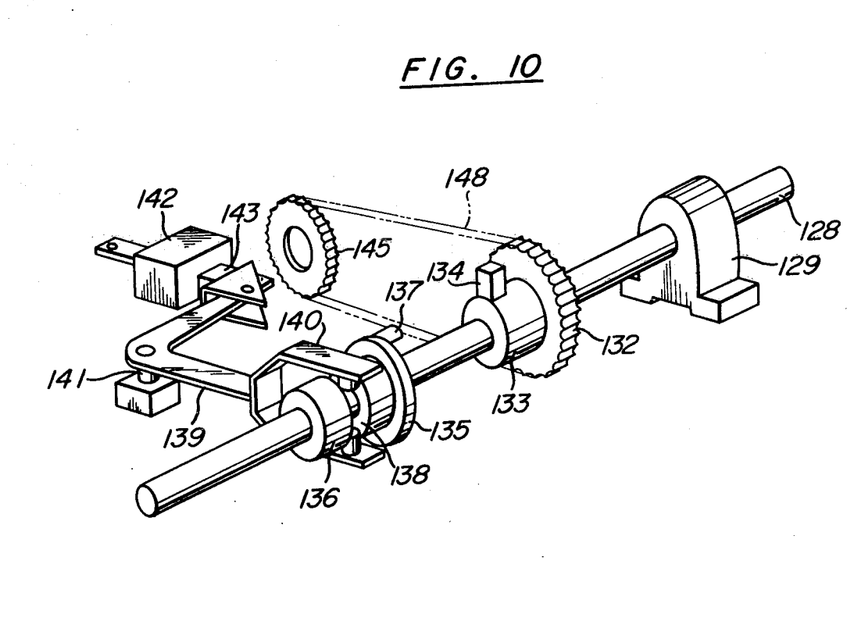
FIG. 10 is a perspective view showing a portion of the clutch mechanism.

Reference numeral 144 in FIG. 9 designates a spring for returning the L-shaped lever 139 to its initial position so that the projection 134 and pin 137 may not be engaged with each other in the deenergized state of the electromagnet 142. This spring 144 is anchored at one end to the frame 130.

Figure 8:
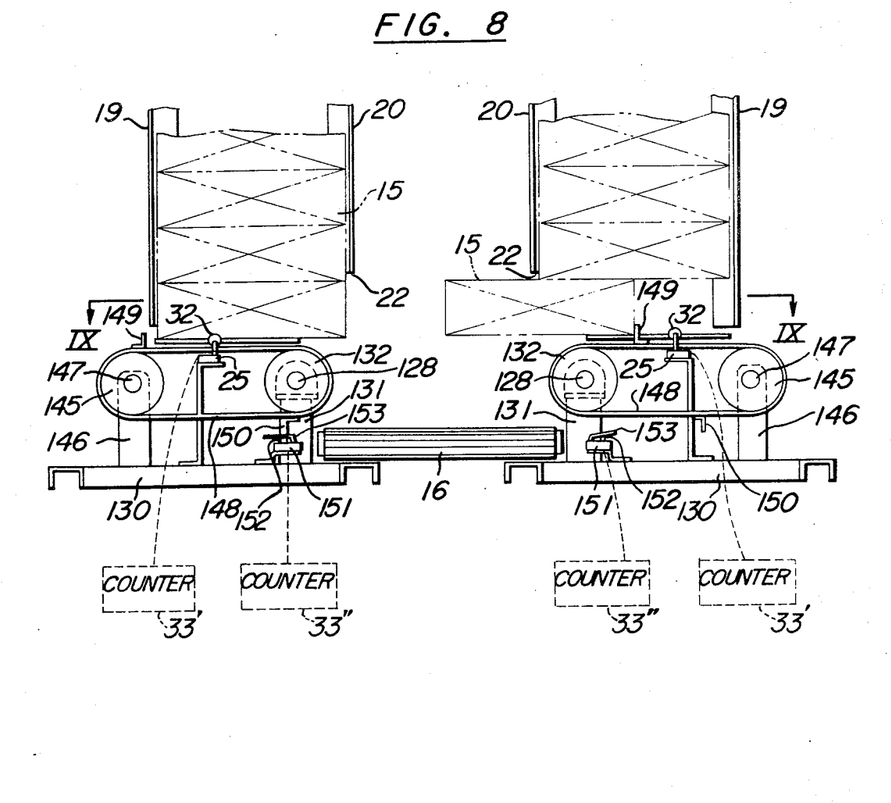
FIG. 8 is a side view of only the delivery means.

A driven sprocket 145 is provided centrally of the bottom end of each storage compartment 14 at a distance from the drive sprocket 132 substantially equal to the length of the storage compartment in the article drawing directions. This driven sprocket 145 is rotatably mounted on a support shaft 147 which is supported by brackets 146 connected to the frame 130, and an endless chain 148 is engaged around the drive sprocket 132 and driven sprocket 145. The chain 148 has extruding members 149, 150 connected thereto which are adapted to engage the side wall of the storage case 15 and extrude said storage case through the delivery opening 22. On the frame 130 is provided a push-button type microswitch 151 at a location to be engaged by that one of the extruding members 150 which is on the lower length of the chain 148 prior to extrusion of the storage case 15. This microswitch 151 is of the type which is turned on when push-pin 152 is depressed and turned off when the depression is removed from said push-pin, and is provided for the purpose of deenergizing the electormagnet 142 when it is turned on in the energized state of said electromagnet. The microswitch 151 has an operation member 153 which depresses the push-pin 152 when engaged by the extruding member 149 or 150. It will be understood that an endless belt may be used in lieu of the chain 148, to extrude the storage case by the friction thereof. It will be also understood that microswitch 151 may be a proximity switch that is turned on or off when approaching the extruding member 149 or 150.

With the arrangement described above, when the desired storage compartment has been selected, the motor 125 for the row of storage compartments in which said desired storage compartment exists, starts rotating and hence the rotary shaft 128 also rotates, provided that the microswitch 25 of the detector means is in its on-position. At the same time, the electromagnet 142 provided below the storage compartment is energized. Therefore, the operating member 143 is attracted against the biasing force of the spring 144, causing the L-shaped lever 139 to make a pivotal movement as shown at the right lower portion of FIG. 9. Consequently, the clutch means is caused to slide toward the drive sprocket 132 by the engaging member 140 and the pin 137 on the disc 135 is brought into engagement with the projection 134 on the collar 133 to drive the drive sprocket 132. The chain 148 is driven by the rotating drive sprocket 132 and thus the lowermost storage case 15 is extruded from the storage compartment 14 through the delivery opening 22 by the extruding member 149 carried by said chain. The other extruding member 150 provided on the chain 148 in this case is released from engagement with the operating member 153, with the result that the microswitch 151 is turned off. The microswitch 151 is again turned on when the operating member 153 is engaged by the extruding member 149 after the storage case 15 has been extruded from the delivery opening 22, whereupon the electromagnet 142 is deenergized and the clutch means is released from engagement with the drive sprocket by the spring 144 as shown in the right upper portion of FIG. 9, and the drive sprocket 132 stops rotating.

Electrical control of this delivery means can be achieved by adding circuit means for discriminating and driving the motor 125 associated with the desired storage compartment to the electrical circuit of FIG. 5 comprising the position signal discriminating circuit 43, the collating circuit 55 and the extruding means operating circuit 56, and by slightly modifying said electrical circuit.

Figure 11:
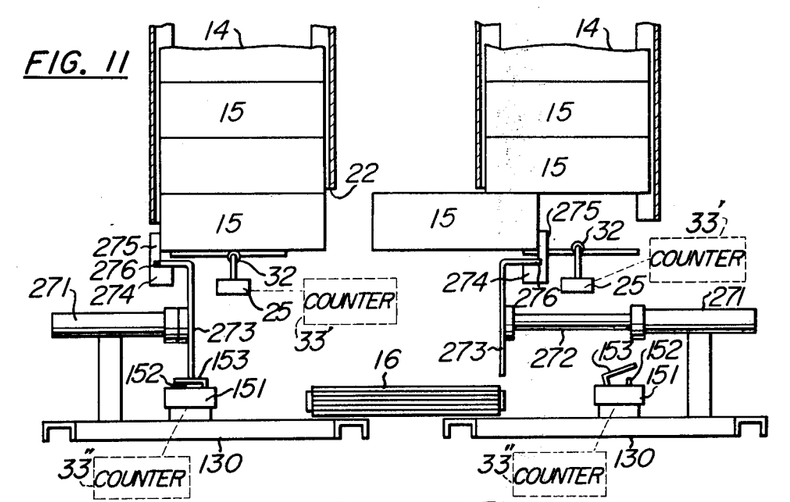
FIG. 11 is a side view showing still another form of the delivery means.

The other embodiment in which an oil or hydraulic cylinder is used for the delivery means will be described with reference to FIGS. 11 and 12. In this embodiment, an oil or hydraulic cylinder 271 is provided at the bottom of each storage compartment 14 in such a manner that a piston rod 272 will project horizontally toward the delivery opening 22 when said cylinder is actuated. The piston rod 272 has connected to its outer end an extruding member supporting plate 273 having a horizontal top end. The lower end of the supporting plate 273 is extended downwardly so as to engage an operating plate member 153 of the microswitch 151 and thereby to hold said microswitch in its off-position in the inoperative state of the cylinder. An extruding member 275 having a weight 274 at the lower portion thereof is pivotally connected at its mid portion to the end extremity of the horizontal top of the extruding member supporting plate 273 by means of a pin 276. The upper surface of the weight 274 is so shaped as to engage the undersurface of the horizontal top portion of the extruding member supporting plate 273 and thereby to hold the extruding member 275 against rotation in a clockwise direction as shown at the right side of FIG. 11 at the time of extruding operation.

Figure 12:
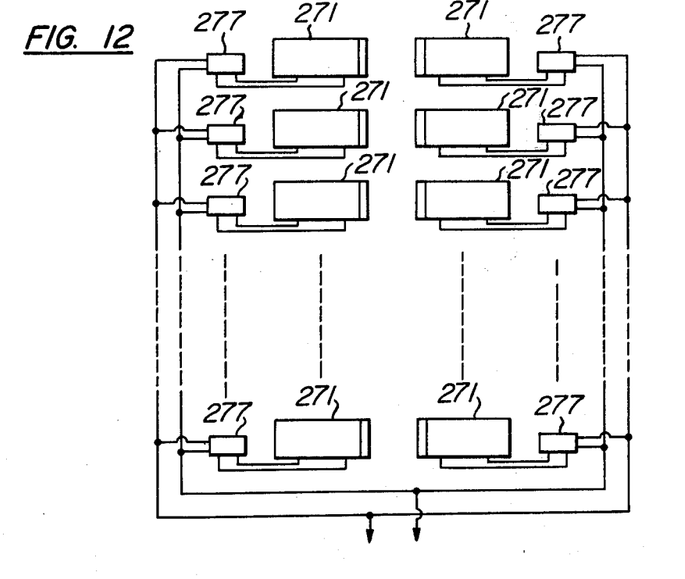
FIG. 12 is a block diagram showing a fluid circuit for the operation of the delivery means in FIG. 11.

These cylinders are respectively connected through solenoid valves 277 to a driving source (not shown) consisting of a pump and a tank, as shown in FIG. 12. Although in the illustration of FIG. 12 the cylinders for one storage unit or 20 storage compartments are connected to one driving source consisting of one pump and one tank, it will be understood that the cylinders of all of five storage units shown in FIG. 1 may to connected to a common driving source or alternately the driving source may be provided each for each row of storage compartments.

With the arrangement described above, when a command signal is given to the desired storage compartment 14, the associated solenoid valve 277 is actuated, provided that the associated microswitch is in its on-position, and thus the associated hydraulic cylinder 271 is actuated by oil supplied from the pump. The piston rod 272 is projected and the lowermost storage case 15 in the storage compartment 14 is extruded through the delivery opening 22 by the extruding member 275 as shown at the right side of FIG. 11. When the lowermost storage case 15 is cleared from the storage compartment and set on the conveyor belt 16, the next higher storage case 15 falls into the lowermost position. In this case, the extruding member 275 abuts against the bottom of the falling next storage case 15 but does not prevent the downward movement of said storage case as it is pivotable in a counterclockwise direction and, therefore, the return movement of the piston rod 272 is not prevented. Although hydraulic cylinders are used in the embodiment shown in FIGS. 11, 12, it will be obviously understood that air cylinders may be used instead of the hydraulic cylinders, and in this case the oil pump is substituted by a compressor and the tank can be eliminated.

Figure 13:
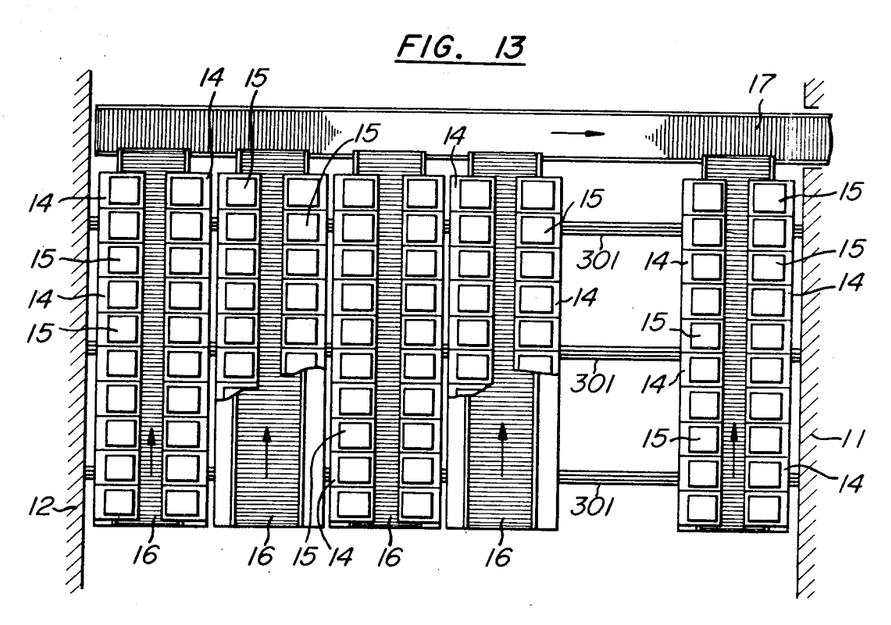
FIG. 13 is a plan view of another embodiment of the invention in which the storage units are respectively mounted on carrier means.

FIG. 13 shows still another embodiment of the invention in which each storage unit is mounted on a carrier truck which is movable horizontally on guide rails 301. Namely, five units of movable article storing and delivering apparatus are closely arranged over the entire floor area of a given space, except for an amount of space sufficient to form a working aisle between the adjacent units, so that the working aisle may be formed as required between the unit in which the desired storage compartment exists and the adjacent unit upon shifting the units on both sides of the aisle into a closely adjoining state respectively. By arranging the storage apparatus units as described above, it becomes unnecessary to provide a working aisle between each of adjacent units as in case of the first embodiment and an amount of space just enough to form one aisle only need to be left. Accordingly, a greater number of apparatus units can be accommodated in a limited space. Each storage apparatus in this embodiment is of the same construction as that of an apparatus in the first embodiment, except that it is mounted on the carrier truck, and the same parts are indicated by the same reference numerals and will not be described again.

A driving mechanism for each carrier truck may be of the type described, for example, in U.S. Pat. No. 3,168,361 which comprises one motor and shifting means, such as a chain or feeder, operatively connecting to said motor to be driven thereby, or may alternatively be of the type described in the co-pending U.S. patent application Ser. No. 124,726 filed Mar. 6, 1971 by the present inventors, which comprise a motor mounted on each carrier truck.

We claim:
1. An apparatus for storing and delivering articles, said apparatus comprising (1) storage means divided longitudinally into a plurality of storage compartments each adapted for accommodating a plurality of articles in substantially vertically stacked array and each having an upper portion provided with an article supply opening and a lower portion provided with an article delivery opening wherethrough articles may be delivered sequentially and laterally from the lowermost one of a stack of articles; (2) delivery means provided at each article delivery opening for delivering one article therethrough at a time, said delivering means including (i) a flexible and movable-in-place endless member in the form of an extended, generally horizontally disposed loop, said loop having one end and another end and arranged such that at least one end thereof is located below the storage compartment with which the particular article delivery opening is associated, and (ii) a plurality of extruding members in peripherally spaced relation on the outer surface of said endless member for successively extruding articles through said delivery opening as said endless member is moved; (3) a rotatably shaft member extending longitudinally of said storage means and disposed to have a driving means connected to it whereby it may be rotated; (4) clutch means on said shaft associated with each of said delivery means whereby said rotatable shaft may be engaged with said delivery means to drive all as well as a plurality of or any single one of the endless members thereof selectively; (5)switching means associated with each of said clutch means for controlling the operation thereof disposed to be engaged by said extruding members successively for the delivery means at each article delivery opening; and (6) conveyor means extending longitudinally of said storage means and having one edge and another edge with said edge located below the delivery openings of said storage compartments, said conveyor means being disposed to receive articles delivered from said delivery openings by the delivery means associated therewith and convey those articles to a desired position.

2. An apparatus for storing and delivering articles as defined in claim 1 wherein said switching means controlling the operation of said clutch means is disposed to be engaged by said extruding members successively at each of a series of starting positions of the endless member of said delivery means as that member performs intermittent in-place motion.

* * * * *